US012627233B2

(12) United States Patent
Su et al.

(10) Patent No.: US 12,627,233 B2
(45) Date of Patent: May 12, 2026

(54) BUCK CONVERTER AND CONTROL METHOD THEREOF

(71) Applicant: PowerX Semiconductor Corporation, Hsinchu County (TW)

(72) Inventors: Chih-Chieh Su, Hsinchu County (TW); Cheng Hsiang Liao, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 209 days.

(21) Appl. No.: 18/735,213

(22) Filed: Jun. 6, 2024

(65) Prior Publication Data

US 2025/0309768 A1    Oct. 2, 2025

(30) Foreign Application Priority Data

Mar. 29, 2024    (TW) ................................. 113112234

(51) Int. Cl.
H02M 3/158        (2006.01)
H02M 1/00         (2006.01)

(52) U.S. Cl.
CPC ......... H02M 3/158 (2013.01); H02M 1/0025 (2021.05)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006; H04B 2215/069
See application file for complete search history.

(56) References Cited

U.S. PATENT DOCUMENTS

| | | | |
|---|---|---|---|
| 9,154,034 B2 | 10/2015 | Ng et al. | |
| 9,467,045 B2 | 10/2016 | Fogg et al. | |
| 11,329,562 B1 | 5/2022 | Hsu | |
| 11,855,537 B2 | 12/2023 | Zhang et al. | |
| 2018/0041117 A1* | 2/2018 | Gong | H02M 3/156 |

FOREIGN PATENT DOCUMENTS

| | | |
|---|---|---|
| CN | 205105092 U | 3/2016 |
| CN | 106374743 B | 4/2019 |
| CN | 114944748 B | 11/2022 |
| CN | 113507213 B | 7/2023 |

(Continued)

*Primary Examiner* — Bryan R Perez

(74) *Attorney, Agent, or Firm* — CKC & Partners Co., LLC

(57) ABSTRACT

A buck converter includes a switching circuit, an error amplifier, a comparator, a reset circuit, a logic gate, a flip-flop and a driver. The switching circuit generates an output voltage according to an input voltage. The error amplifier generates a compensation voltage signal according to a feedback voltage signal and the reference voltage signal. The feedback voltage signal is associated with the output voltage. The comparator generates a clock set signal according to the compensation voltage signal and a ramp voltage signal. The reset circuit generates a first reset signal according to an on-time control signal. The logic gate generates a second reset signal according to the clock set signal and the first reset signal. The flip-flop generates the on-time control signal according to the clock set signal and the second reset signal. The driver controls the switching circuit according to the on-time control signal.

20 Claims, 7 Drawing Sheets

(56)        References Cited

FOREIGN PATENT DOCUMENTS

| TW | I473409 B | 2/2015 |
| TW | 201626704 A | 7/2016 |
| TW | I558082 B | 11/2016 |
| TW | 202316778 A | 4/2023 |
| TW | I802319 B | 5/2023 |
| TW | 202337118 A | 9/2023 |
| TW | I828463 B | 1/2024 |

* cited by examiner

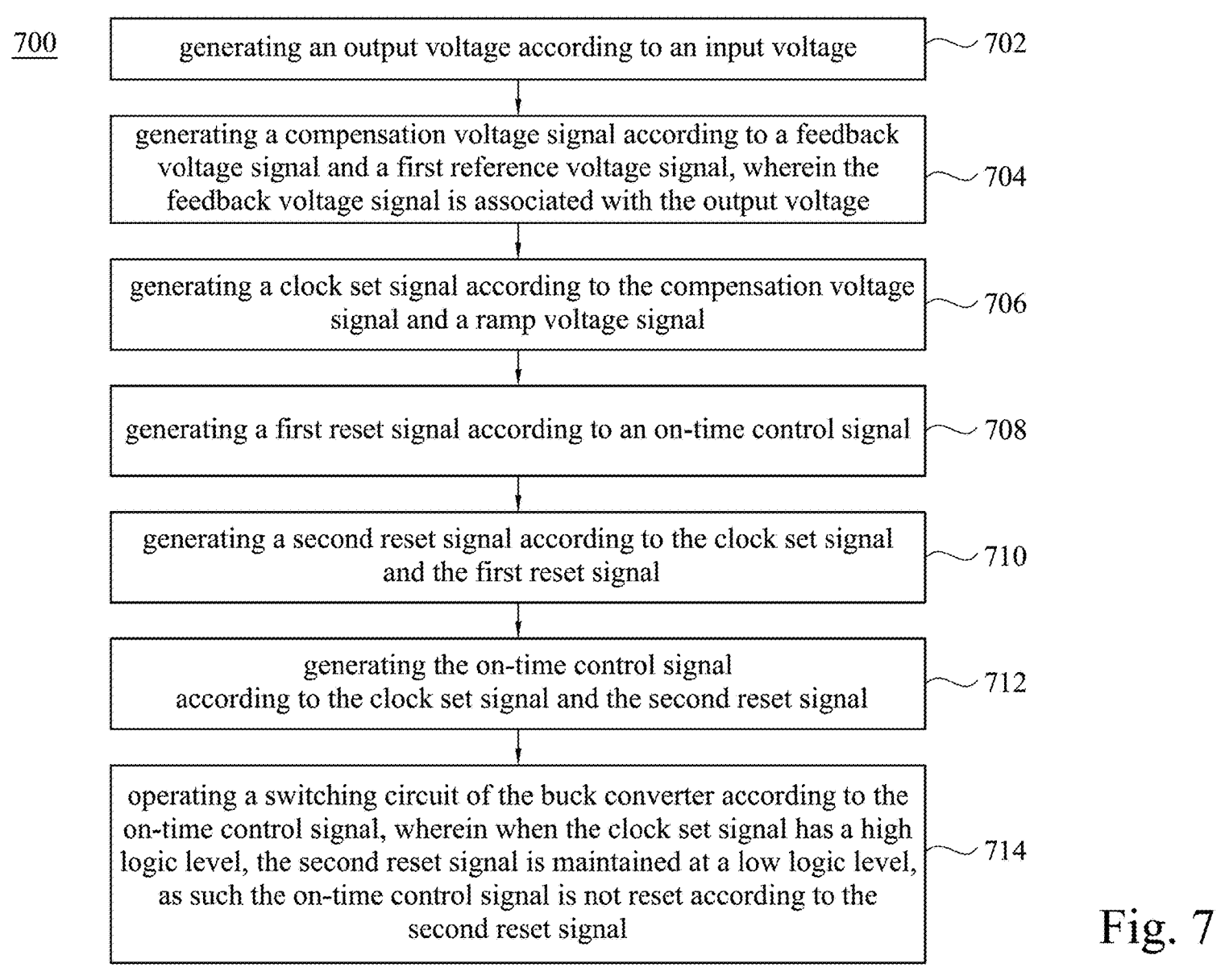

700

702 generating an output voltage according to an input voltage 704 generating a compensation voltage signal according to a feedback voltage signal and a first reference voltage signal, wherein the feedback voltage signal is associated with the output voltage 706 generating a clock set signal according to the compensation voltage signal and a ramp voltage signal 708 generating a first reset signal according to an on-time control signal 710 generating a second reset signal according to the clock set signal and the first reset signal 712 generating the on-time control signal according to the clock set signal and the second reset signal 714 operating a switching circuit of the buck converter according to the on-time control signal, wherein when the clock set signal has a high logic level, the second reset signal is maintained at a low logic level, as such the on-time control signal is not reset according to the second reset signal

Fig. 7

BUCK CONVERTER AND CONTROL METHOD THEREOF

CROSS-REFERENCE TO RELATED APPLICATION

This application claims priority to Taiwan Application Serial Number 113112234, filed Mar. 29, 2024, which is herein incorporated by reference in its entirety.

BACKGROUND

Field of Invention

The present invention relates to a buck converter and a control method thereof. More particularly, the present invention relates to a buck converter and a control method thereof associated with constant on-time (COT).

Description of Related Art

As the improvement in the semiconductor techniques, the current required by a central processing unit or an application specific integrated circuit becomes larger, and the voltage conversion rate becomes higher. Therefore, the performance of the load transient response for a buck converter has also become important.

There are several modes provided to control buck converter, including a voltage mode, a current mode and a constant on-time mode, etc., wherein a buck converter controlled in the constant on-time mode maintains the duty ratio by adjusting the turn-off duration, which has the better transient response compared to the voltage mode/current mode. In the architecture with constant on-time, when a condition is changed from a light load to a heavy load, the buck converter decreases the turn-off duration for a switching circuit, which means that the switching frequency for turning on or turning off the switching circuit is increased to comply with the requirement of the output current. However, the said switching frequency in the architecture with constant on-time is still limited by the minimum off-time, such that the load transient is not ideal. To expand the on-time duration, the prior art provides multiple threshold voltages by adding a lots of circuit elements; in order to improve the load transient response, however, which also increases the circuit complexity.

SUMMARY

The present disclosure provides a buck converter. The buck converter comprises a switching circuit, an error amplifier, a first comparator, an on-time control circuit and a driver. The switching circuit is electrically connected to an input voltage, and the switching circuit is configured to generate an output voltage at an output node of the buck converter according to the input voltage. The error amplifier is configured to receive a feedback voltage signal and generate a compensation voltage signal according to the feedback voltage signal and a first reference voltage signal. The feedback voltage signal is associated with the output voltage. The first comparator is electrically connected to the error amplifier. The first comparator is configured to generate a clock set signal according to the compensation voltage signal and a ramp voltage signal. The on-time control circuit is electrically connected to the first comparator. The on-time control circuit comprises a reset circuit, a logic gate, a flip-flop and a driver. The reset circuit is configured to generate a first reset signal according to the on-time control signal. The logic gate is electrically connected to the first comparator and the reset circuit. The logic gate is configured to generate a second reset signal according to the clock set signal and the first reset signal. The flip-flop is electrically connected to the logic gate and the logic gate. The flip-flop is configured to generate the on-time control signal according to the clock set signal and the second reset signal. The driver is electrically connected to the on-time control circuit and the switching circuit. The driver is configured to control the switching circuit according to the on-time control signal. When the clock set signal has a first logic level, the logic gate maintains the second reset signal at a second logic level different from the first logic level, as such the on-time control signal is not reset according to the second reset signal.

The present disclosure control method for a buck converter. The buck converter comprises a switching circuit, an error amplifier, a first comparator, an on-time control circuit and a driver. The first comparator is electrically connected to the error amplifier. The on-time control circuit is electrically connected to the first comparator. The driver is electrically connected to the on-time control circuit and the switching circuit. The on-time control circuit comprises a reset circuit, a logic gate and a flip-flop. The logic gate is electrically connected to the first comparator and the reset circuit. The flip-flop is electrically connected to the logic gate and the first comparator. The control method comprises the following steps. An output voltage at an output node of the buck converter is generated by the switching circuit according to an input voltage. A compensation voltage signal is generated by the error amplifier according to a feedback voltage signal and a first reference voltage signal. The feedback voltage signal is associated with the output voltage. A clock set signal is generated by a first comparator according to the compensation voltage signal and a ramp voltage signal. A first reset signal is generated by the reset circuit according to an on-time control signal. A second reset signal is generated by the logic gate according to the clock set signal and the first reset signal. The on-time control signal is generated by the flip-flop according to the clock set signal and the second reset signal. The switching circuit is controlled by the driver according to the on-time control signal. When the clock set signal has a first logic level, the second reset signal is maintained, by the logic gate, at a second logic level different from the first logic level, as such the on-time control signal is not reset according to the second reset signal.

Summary, the present disclosure provides a buck converter which utilizes a clock set signal cooperating with a logic gate to expand the on-time duration, it can provide the better load transient response without adding additional comparator, thus the circuit complexity does not increase significantly.

BRIEF DESCRIPTION OF THE DRAWINGS

The present disclosure can be more fully understood by reading the following detailed description of the embodiment, with reference made to the accompanying drawings as follows.

FIG. 7 depicts a flow chart of a control method for a buck converter according to one embodiment of the present disclosure.

DETAILED DESCRIPTION

Figure 1:
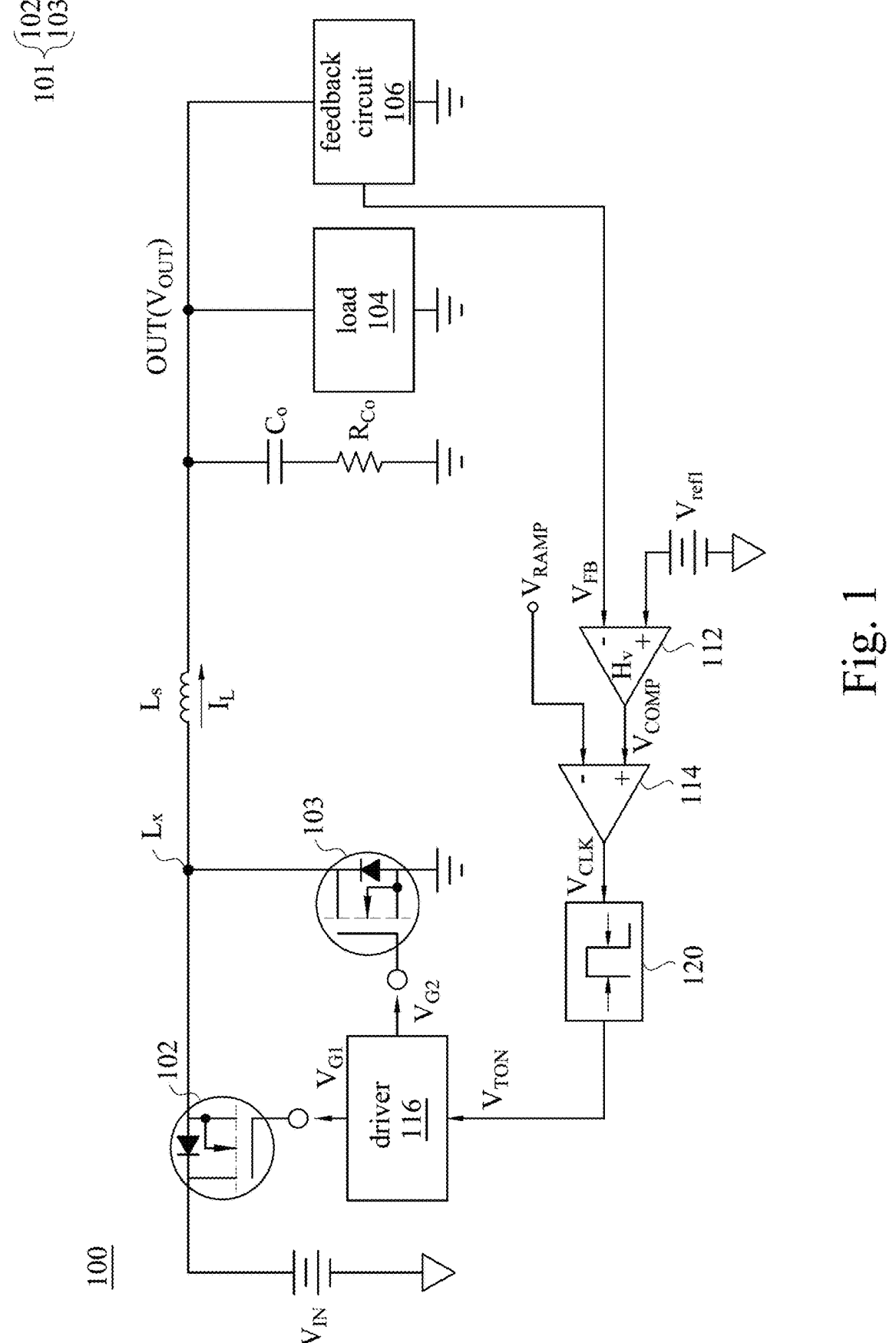
FIG. 1 depicts a schematic diagram of a buck converter according to one embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1. FIG. 1 depicts a schematic diagram of a buck converter according to one embodiment of the present disclosure. As shown in FIG. 1, the buck converter 100 comprises a switching circuit 101, a feedback circuit 106, an error amplifier 112, a first comparator 114, a driver 116, an on-time control circuit 120, an output capacitor $C_o$ and a resistor $R_{Co}$. In some embodiments, the switching circuit 101 is electrically connected to an input voltage $V_{IN}$ and the switching circuit 101 is electrically connected through the inductor $L_S$ to an output node OUT. In some embodiments, the switching circuit 101 comprises a high-side switch 102 and a low-side switch 103. For example, the high-side switch 102 and the low-side switch 103 can be implemented by, such as, NMOS transistors, but it is not intended to limit the present disclosure. In some embodiments, a first terminal of the high-side switch 102 is electrically connected to the input voltage $V_{IN}$, and a second terminal of the high-side switch 102 is electrically connected to a first terminal of the inductor $L_S$; a first terminal of the low-side switch 103 is electrically connected to the first terminal of the inductor $L_S$, and a second terminal of the low-side switch 103 is electrically connected to a ground. That is, the inductor $L_S$ is electrically connected to the high-side switch 102 and the low-side switch 103 through a phase node $L_X$.

The inductor $L_S$ is electrically connected between the switching circuit 101 and the output node OUT. In some embodiments, the inductor $L_S$ is configured to generate an inductor current $I_L$ according to the operation of the switching circuit 101. The first terminal of the output capacitor $C_o$ is electrically connected between a second terminal of the inductor $L_S$ and the output node OUT. The resistor $R_{Co}$ is electrically connected between a second terminal of the output capacitor $C_o$ and the ground. The feedback circuit 106 is electrically connected to the output node OUT, and the feedback circuit 106 is configured to generate a feedback voltage signal $V_{FB}$ according to an output voltage $V_{OUT}$ at the output node OUT, and the feedback voltage signal $V_{FB}$ comprises information about the output voltage $V_{OUT}$. In some embodiments, the feedback circuit 106 can be implemented by a voltage divider circuit.

The error amplifier 112 is configured to compare the feedback voltage signal $V_{FB}$ with a first reference voltage signal $V_{ref1}$, and the error amplifier 112 is configured to generate a compensation voltage signal $V_{COMP}$ at its output terminal according to a difference between the feedback voltage signal $V_{FB}$ and the first reference voltage signal $V_{ref1}$. In some embodiments, an inverting input terminal (which is represented by "−" in drawings) of the error amplifier 112 is configured to receive the feedback voltage signal $V_{FB}$, and a non-inverting input terminal (which is represented by "+" in drawings) of the error amplifier 112 is electrically connected to a reference voltage source to receive the first reference voltage signal $V_{ref1}$.

In some embodiments, an inverting input terminal (−) of the first comparator 114 is configured to receive a ramp voltage signal $V_{RAMP}$, and a non-inverting input terminal (+) of the first comparator 114 is electrically connected to the output terminal of the error amplifier 112 to receive the compensation voltage signal $V_{COMP}$. In some embodiments, the first comparator 114 generates a clock set signal $V_{CLK}$ at its output terminal according to the ramp voltage signal $V_{RAMP}$ and the compensation voltage signal $V_{COMP}$.

In some embodiments, the on-time control circuit 120 is electrically connected to the output terminal of the first comparator 114 to receive the clock set signal $V_{CLK}$ generated by the first comparator 114. In some embodiments, the on-time control circuit 120 generates a on-time control signal $V_{TON}$ according to the clock set signal $V_{CLK}$, and the driver 116 controls the operation of the switching circuit 101 according to the on-time control signal $V_{TON}$. In some embodiments, the driver 116 generates control signals $V_{G1}$ and $V_{G2}$ according to the on-time control signal $V_{TON}$, so as to control the operations of the high-side switch 102 and the low-side switch 103, respectively.

Figure 2:
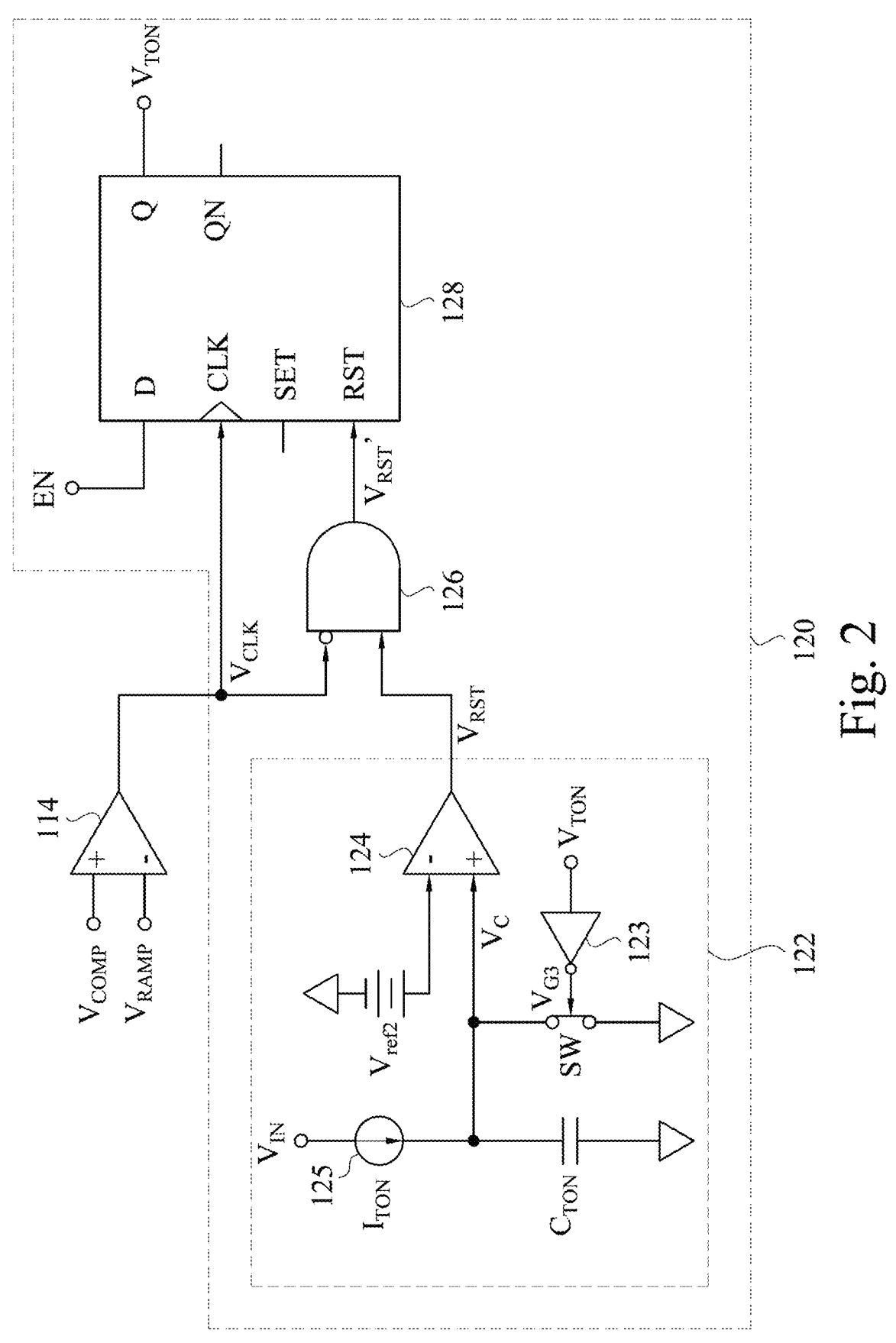
FIG. 2 depicts a schematic diagram of an on-time control circuit according to an embodiment of the present disclosure.

A description is provided with reference to FIG. 2. FIG. 2 depicts a schematic diagram of an on-time control circuit 120 according to one embodiment of the present disclosure. As shown in FIG. 2, the on-time control circuit 120 comprises a reset circuit 122, a logic gate 126 and a flip-flop 128.

In some embodiments, the reset circuit 122 comprises an inverter 123, a second comparator 124, a current source 125, a capacitor $C_{TON}$ and a switch SW. In some embodiments, an inverting input terminal (−) of the second comparator 124 is electrically connected to a reference voltage source to receive a second reference voltage signal $V_{ref2}$. A non-inverting input terminal (+) of the second comparator 124 is electrically connected to the current source 125, the capacitor $C_{TON}$ and the switch SW, and the current source 125 is electrically connected to the input voltage $V_{IN}$ and generates a current $I_{TON}$. In some embodiments, the switch SW is electrically connected between the non-inverting input terminal of the second comparator 124 and the ground terminal, and a control terminal of the switch SW is electrically connected to an output terminal of the inverter 123. In some embodiments, the switch SW can be implemented by an NMOS transistor, but this is not intended to limit the present disclosure.

An input terminal of the inverter 123 is configured to receive the on-time control signal $V_{TON}$ to output a control signal $V_{G3}$, which is inverted to the on-time control signal $V_{TON}$, to a control terminal of the switch SW. Accordingly, the switch SW turns on/off a current path from the non-inverting input terminal of the second comparator 124 to the ground terminal according to the on-time control signal $V_{TON}$, so as to change a voltage $V_C$ at the non-inverting input terminal of the second comparator 124. The second comparator 124 generates a first reset signal $V_{RST}$ according to the voltage $V_C$ and the second reference voltage signal $V_{ref2}$. The following description will be described by using an NMOS transistor to implement the switch SW as an example. A first logic level (such as, a high logic level) represents a voltage level (e.g., logic "1") which can substantially turn on the NMOS transistor, the second logic level (such as, a low logic level) represents a voltage level (e.g., logic "0") which can substantially turn off the NMOS transistor, and the aforementioned low logic level is lower than the high logic level. However, a person having ordinary skill in the art is able to replace the NMOS transistor with a PMOS transistor in consideration of practical circuit designs and accordingly design logic levels of control signals received by signal terminals of respective components, which is generally known to a person having ordinary skill in the art, and the detailed description is omitted here for brevity.

The operation of the reset circuit 122 is described as following. When the on-time control signal $V_{TON}$ is at the high logic level, the inverter 123 generates the control signal $V_{G3}$ having the low logic level to the control terminal of the switch SW, such that the switch SW turns off a current path from the non-inverting input terminal of the second comparator 124 to the ground terminal, and the current $I_{TON}$ generated by the current source 125 charges the capacitor $C_{TON}$. Accordingly, the voltage $V_C$ at the non-inverting input terminal of the second comparator 124 is gradually increased. When the voltage $V_C$ is increased to be greater than the second reference voltage signal $V_{ref2}$, the first reset signal $V_{RST}$ output by the second comparator 124 is at the high logic level. On the other hand, when the on-time control signal $V_{TON}$ is at the low logic level, the inverter 123 generates the control signal $V_{G3}$ having the high logic level to the control terminal of the switch SW, such that the switch SW turns on the current path from the non-inverting input terminal of the second comparator 124 to the ground terminal, and the capacitor $C_{TON}$ is discharged to the ground terminal. When the voltage $V_C$ at the first terminal of the capacitor $C_{TON}$ is decreased to be less than the second reference voltage signal $V_{ref2}$ due to the discharge of the capacitor $C_{TON}$, the first reset signal $V_{RST}$ output by the second comparator 124 is at the low logic level. Based on the above operation, since the capacitance of the capacitor $C_{TON}$ and the amplitude of the current $I_{TON}$ are constant values, the first reset signal $V_{RST}$ output by the second comparator 124 changes from the low logic level to the high logic level after a fixed period of time.

In some embodiments, a NOT gate is disclosed at a first input terminal of the logic gate 126. Referring to FIG. 2, the NOT gate is represented by a hollow circle in the drawing. The NOT gate is configured to inverse the clock set signal $V_{CLK}$. A first input terminal of the logic gate 126 is electrically connected to an output terminal of the first comparator 114 to receive the clock set signal $V_{CLK}$. A second input terminal of the logic gate 126 is electrically connected to the output terminal of the second comparator 124 to receive the first reset signal $V_{RST}$. The logic gate 126 generates the second reset signal $V_{RST'}$ at its output terminal according to the clock set signal $V_{CLK}$ and the first reset signal $V_{RST}$. When the output terminal of the first comparator 114 outputs the clock set signal $V_{CLK}$ having the low logic level to the first input terminal of the logic gate 126 and the second input terminal of the logic gate 126 receives the first reset signal $V_{RST}$ having the high logic level, the output terminal of the logic gate 126 outputs the second reset signal $V_{RST'}$ having the high logic level. When the output terminal of the first comparator 114 outputs the clock set signal $V_{CLK}$ having the high logic level to the first input terminal of the logic gate 126, whether the second input terminal of the logic gate 126 receives the signal having the high logic level or the low logic level, the output terminal of the logic gate 126 outputs the second reset signal $V_{RST'}$ having at the low logic level.

In some embodiments, the first comparator 114 is configured to compare the compensation voltage signal $V_{COMP}$ with the ramp voltage signal $V_{RAMP}$ to generate the clock set signal $V_{CLK}$ to the logic gate 126 and the flip-flop 128. When the clock set signal $V_{CLK}$ is at the high logic level, the second reset signal $V_{RST'}$ generated by the logic gate 126 must be at the low logic level; when the clock set signal $V_{CLK}$ is at the low logic level, the logic level of the second reset signal $V_{RST'}$ is the same as the logic level of the first reset signal $V_{RST}$. In some embodiments, the logic gate 126 generates the second reset signal $V_{RST'}$ according to the logical "AND" of the signal inverted to the clock set signal $V_{CLK}$ output by the output terminal of the first comparator 114 and the first reset signal $V_{RST}$ output by the second comparator 124.

Furthermore, the flip-flop 128 can be considered as a D-type flip-flop. According to some embodiments of the present disclosure, the applied pins of the flip-flop 128 comprises a data input pin D, a clock input pin CLK, a reset pin RST and an output pin Q. The data input pin D is configured to receive an enable signal EN, and the enable signal EN can be permanently set at the high logic level in these embodiments. The clock input pin CLK is electrically connected to the output terminal of the first comparator 114 to receive the clock set signal $V_{CLK}$. The reset pin RST is electrically connected to the output terminal of the logic gate 126 to receive the second reset signal $V_{RST'}$. The output pin Q is configured to output the on-time control signal $V_{TON}$. The concrete operation of the flip-flop 128 is described as the following. When the second reset signal $V_{RST'}$ received by the reset pin RST receives is at the logic 0 (such as, the said low logic level or the second logic level) and the clock set signal $V_{CLK}$ received by the clock input pin CLK changes from the logic 0 to the logic 1 (such as, the said high logic level or the first logic level) (which means rising edge trigger), the output pin Q outputs the on-time control signal $V_{TON}$ being at logic 1; after that, when the second reset signal $V_{RST'}$ received by the reset pin RST changes to the logic 1, the on-time control signal $V_{TON}$ output by the output pin Q is pulled down to the logic 0. According to the embodiments of the present disclosure, when the compensation voltage signal $V_{COMP}$ is greater than the ramp voltage signal $V_{RAMP}$, the clock set signal $V_{CLK}$ generated by the first comparator 114 changes to the high logic level from the low logic level. Meanwhile, the clock set signal $V_{CLK}$ triggers the flip-flop 128 to output the on-time control signal $V_{TON}$ having the high logic level. On the other hand, when the compensation voltage signal $V_{COMP}$ is less than the ramp voltage signal $V_{RAMP}$, the clock set signal $V_{CLK}$ generated by the first comparator 114 is at the low logic level. Meanwhile, when the first reset signal $V_{RST}$ output by the second comparator 124 is at the high logic level, the output terminal of the logic gate 126 outputs the second reset signal $V_{RST'}$ having the high logic level, so as to reset the on-time control signal $V_{TON}$ output by the flip-flop 128 to the low logic level.

Figure 3:
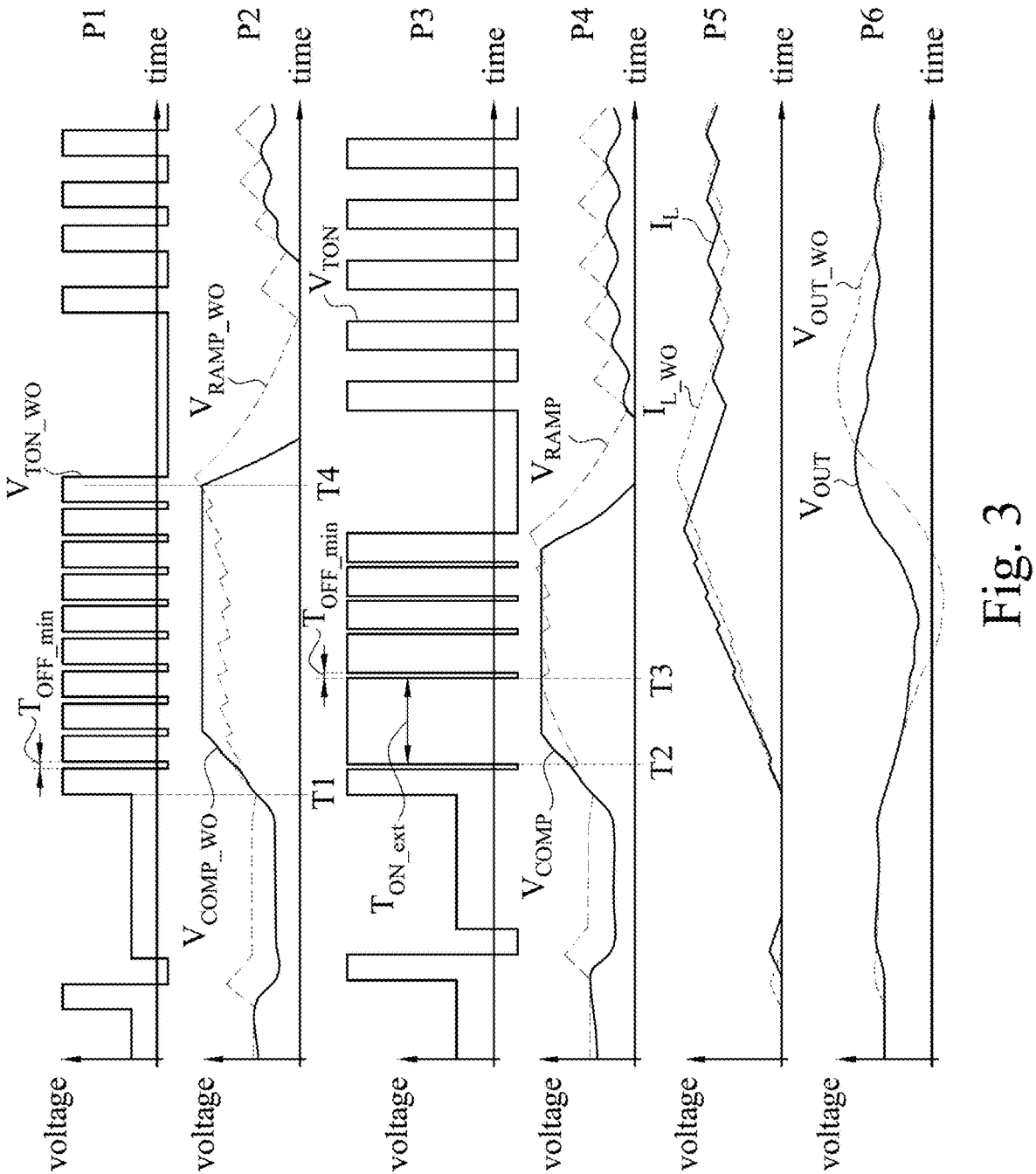
FIG. 3 depicts signal waveforms of a buck converter induced by a fast transient response when a light load changes to a heavy load condition from a no-load or light load condition.

For better understanding of the expanded on-time architecture in the present disclosure, a description is provided with reference to FIG. 1, FIG. 2 and FIG. 3. FIG. 3 depicts waveform diagrams for illustrating transient response of the buck converter 100 of the present disclosure in contrast with the prior art. As shown in FIG. 3, a subplot P1 illustrates a waveform of the on-time control signal $V_{TON\_WO}$ of the prior art (without the expanded on-time architecture of the present disclosure as shown in FIG. 2), a subplot P2 illustrates waveforms of the compensation voltage signal $V_{COMP\_WO}$ of the prior art in contrast with the ramp voltage signal $V_{RAMP\_WO}$, a subplot P3 illustrates a waveform of the on-time control signal $V_{TON}$ in the expanded on-time architecture of the present disclosure as shown in FIG. 2, a subplot P4 illustrates waveforms of the compensation voltage signal $V_{COMP}$ in contrast with the ramp voltage signal $V_{RAMP}$ of the present disclosure, subplot P5 illustrates the inductor current $I_L$ of the present disclosure in contrast with the inductor current $I_{L\_WO}$ of the prior art, and a subplot P6 illustrates waveforms of the output voltage $V_{OUT}$ of the present disclosure in contrast with the output voltage $V_{OUT\_WO}$ of the prior art.

A description is provided with reference to subplots P3 and P4. During the period between the time T2 and the time T3, if the compensation voltage signal $V_{COMP}$ is greater than the ramp voltage signal $V_{RAMP}$, it means that the buck converter 100 still requires more power to deal with the workload, and the clock set signal $V_{CLK}$ generated by the first comparator 114 changes to the high logic level from the low logic level, such that the second reset signal $V_{RST'}$ generated by the logic gate 126 must be maintained at the low logic level. Thus, the on-time control signal $V_{TON}$ output by the output pin Q is not reset, so as to expand the on-time duration, as shown in the expanded on-time duration $T_{ON\_ext}$ in the subplot P3. The buck converter 100 of the present disclosure can expand the duration of the turn-on control signal $V_{TON}$ being at the high logic level under the heavy load condition. Furthermore, the turn-on control signal $V_{TON}$ is maintained at the high logic level during the entire period between the time T2 to the time T3 until the compensation voltage signal $V_{COMP}$ is not greater than the ramp voltage signal $V_{RAMP}$ at the time T3. At the time T3, the turn-on control signal $V_{TON}$ is reset. In other words, during the period when the voltage of the turn-on control signal $V_{TON}$ is greater than the voltage of the ramp voltage signal $V_{RAMP}$, when the first reset signal $V_{RST}$ changes to the high logic level from the low logic level, the flip-flop 128 is not reset, and the flip-flop 128 outputs the on-time control signal having the high logic level. As a result, the buck converter 100 of the present disclosure is not limit by the minimum turn-off time under the heavy load condition, so as to achieve the expansion of the on-time duration $T_{ON\_ext}$, as such the buck converter 100 has faster response performance.

In conclusion, based on the design of the on-time control circuit 120, whether the on-time control signal $V_{TON}$ will be reset depends on the comparison between the compensation voltage signal $V_{COMP}$ and the ramp voltage signal $V_{RAMP}$ because the present disclosure utilizes the second reset signal $V_{RST'}$ to reset the flip-flop 128 instead of the first reset signal $V_{RST}$. When the compensation voltage signal $V_{COMP}$ is still greater than the ramp voltage signal $V_{RAMP}$, it means that the buck converter 100 is still required to provide power to the output node OUT. At this time, the flip-flop 128 can be restricted to not be reset by the logic gate 126, thereby achieving the effect of expanded on-time duration. In other words, during the period when the compensation voltage signal $V_{COMP}$ is greater than the ramp voltage signal $V_{RAMP}$, even if the voltage at the first terminal of the capacitor $C_{TON}$ is gradually increased to be greater than the second reference voltage signal $V_{ref2}$, the logic gate 126 maintains the second reset signal $V_{RST'}$ at the second logic level. Accordingly, when the compensation voltage signal $V_{COMP}$ becomes less than the ramp voltage signal $V_{RAMP}$, which means that the loop can regulate the voltage in normal, then the logic gate 126 resets the flip-flop 128. Compare to the prior art, the present disclosure can achieve purpose of expanding on-time duration by disposing the reset circuit 122 and the logic gate 126 in the on-time control circuit 120 on a basis of the original constant on-time architecture, and whether the on-time duration is expanded is determined by the loop of the on-time control circuit 120. Therefore, there is no need to additionally consider the other factors to adjust the settings, and there is no significant increase in additional cost of the architecture of the present disclosure. In addition, it can be known from the subplots P5, P6, by comparing to the prior art, the buck converter 100 has the sufficient inductor current during the heavy load condition based on the expanded on-time duration of the buck converter 100 of the present disclosure, and the undershoot occurring on the output voltage is reduced, that is, the present disclosure can provide better load transient response.

Figure 4:
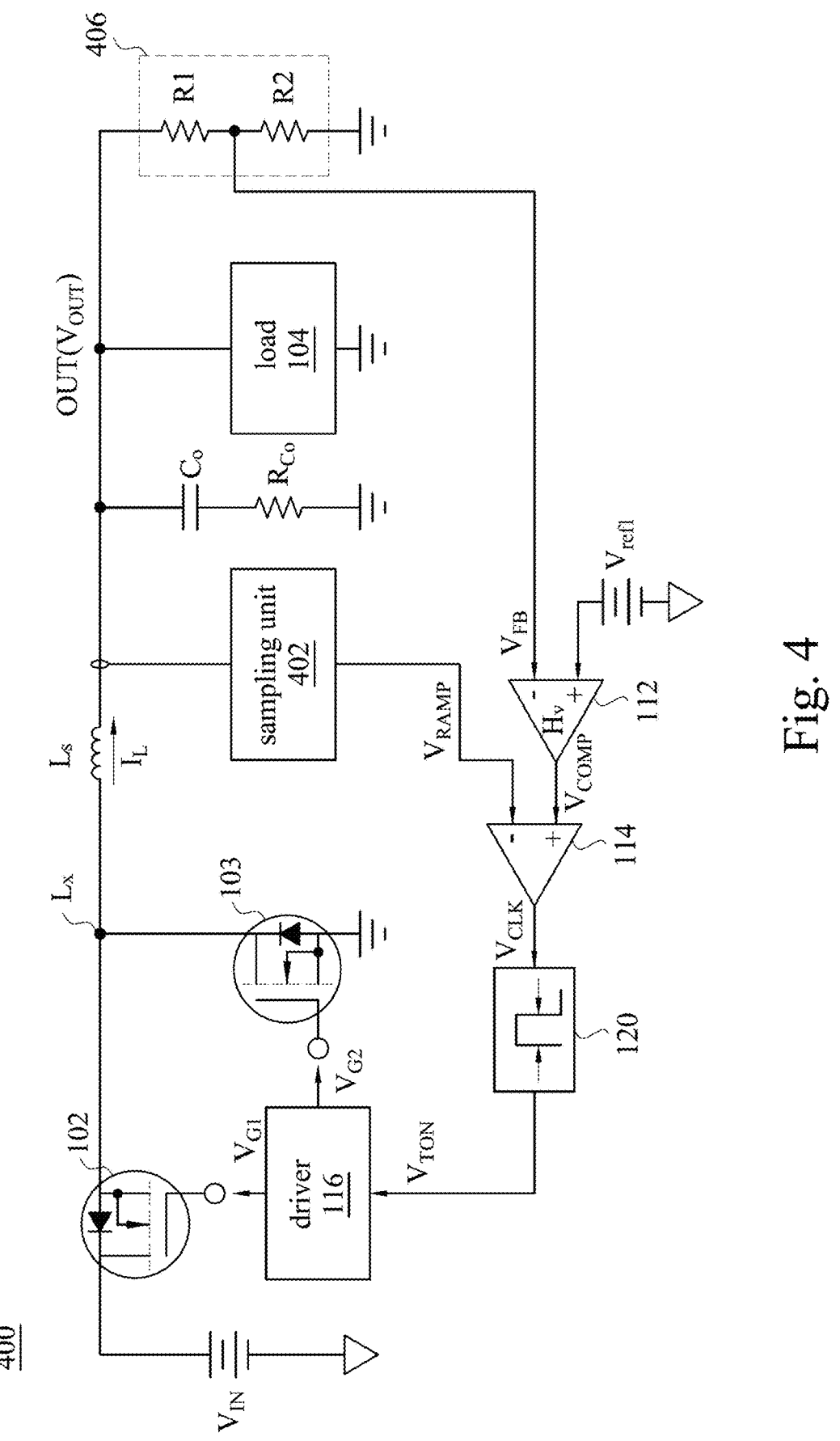
FIG. 4 depicts a schematic diagram of a buck converter according to another embodiment of the present disclosure.

In some embodiments, the control scheme for the on-time control of the buck converter 100 can be implemented by a current control. In the on-time current control mode, the ramp voltage signal $V_{RAMP}$ can be generated according to the inductor current $I_L$, concrete reference is made to FIG. 4, FIG. 4 depicts a schematic diagram of a buck converter 400 according to another embodiment of the present disclosure. As shown in FIG. 4, the buck converter 400 comprises a high-side switch 102, a low-side switch 103, a feedback circuit 406, an error amplifier 112, a first comparator 114, a driver 116, an on-time control circuit 120, an output capacitor $C_o$, a resistor $R_{Co}$ and the sampling unit 402. The structure and the operations between the high-side switch 102, the low-side switch 103, the feedback circuit 406, the error amplifier 112, the first comparator 114, the driver 116, the on-time control circuit 120, the output capacitor $C_o$, a resistor $R_{Co}$ of the buck converter 400 correspond to the structure and the operations between the high-side switch 102, the low-side switch 103, the feedback circuit 106, the error amplifier 112, the first comparator 114, the driver 116, the on-time control circuit 120, the output capacitor $C_o$ of the buck converter 100 in FIG. 1, and thus the related description is omitted here.

As shown in FIG. 4, the feedback circuit 406 is a voltage divider circuit constituted by resistors R1 and R2, which can be an example of the feedback circuit 106 in FIG. 1. The sampling unit 402 is electrically connected to the first comparator 114. The sampling unit 402 obtains the inductor current $I_L$ flowing through the inductor $L_S$ to generate a voltage drop according to the inductor current $I_L$ as the ramp voltage signal $V_{RAMP}$. There are many means for generating the ramp voltage signal $V_{RAMP}$ according to the inductor current $I_L$, and the present disclosure is not limited by the manner for generating the inductor current $I_L$.

Figure 5:
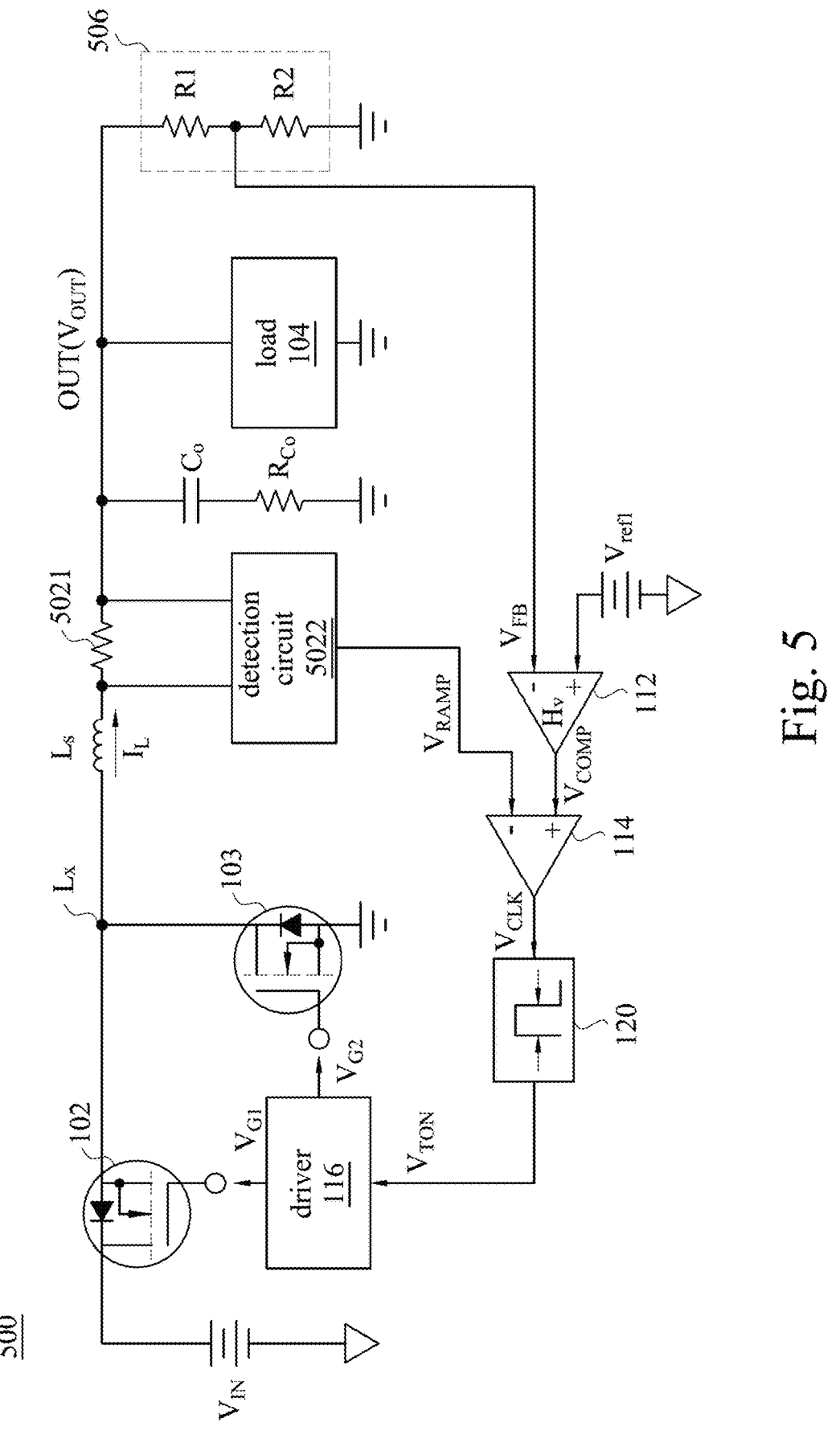
FIG. 5 depicts a schematic diagram of a buck converter according to another embodiment of the present disclosure.

For example, a description is provided with reference to FIG. 5. FIG. 5 depicts a schematic diagram of a buck converter 500 according to another embodiment of the present disclosure, in which a sampling unit 502 can be considered as an example of the sampling unit 402 in FIG. 4. As shown in FIG. 5, the sampling unit 502 of the buck converter 500 comprises a shunt resistor 5021 and a detection circuit 5022. The shunt resistor 5021 is electrically connected between the inductor $L_S$ and the feedback circuit 506, and the detection circuit 5022 generates the ramp voltage signal $V_{RAMP}$ according to a voltage across the shunt resistor 5021. Specifically, the detection circuit 5022 obtains a voltage difference between the two terminals of the shunt resistor 5021 (that is, a voltage drop across the shunt resistor 5021) and then generates the ramp voltage signal $V_{RAMP}$ according to the obtained voltage difference. Based on the Ohm's law, the obtained voltage difference represents the current flowing through the shunt resistor 5021 (that is the inductor current $I_L$). Thus, the on-time current control mode can be achieved by generating the ramp voltage signal $V_{RAMP}$ according to the inductor current $I_L$. How to generate the ramp voltage signal $V_{RAMP}$ according to the inductor current $I_L$ is generally known to the person skilled in the art, and the detailed description is omitted here for brevity.

Figure 6:
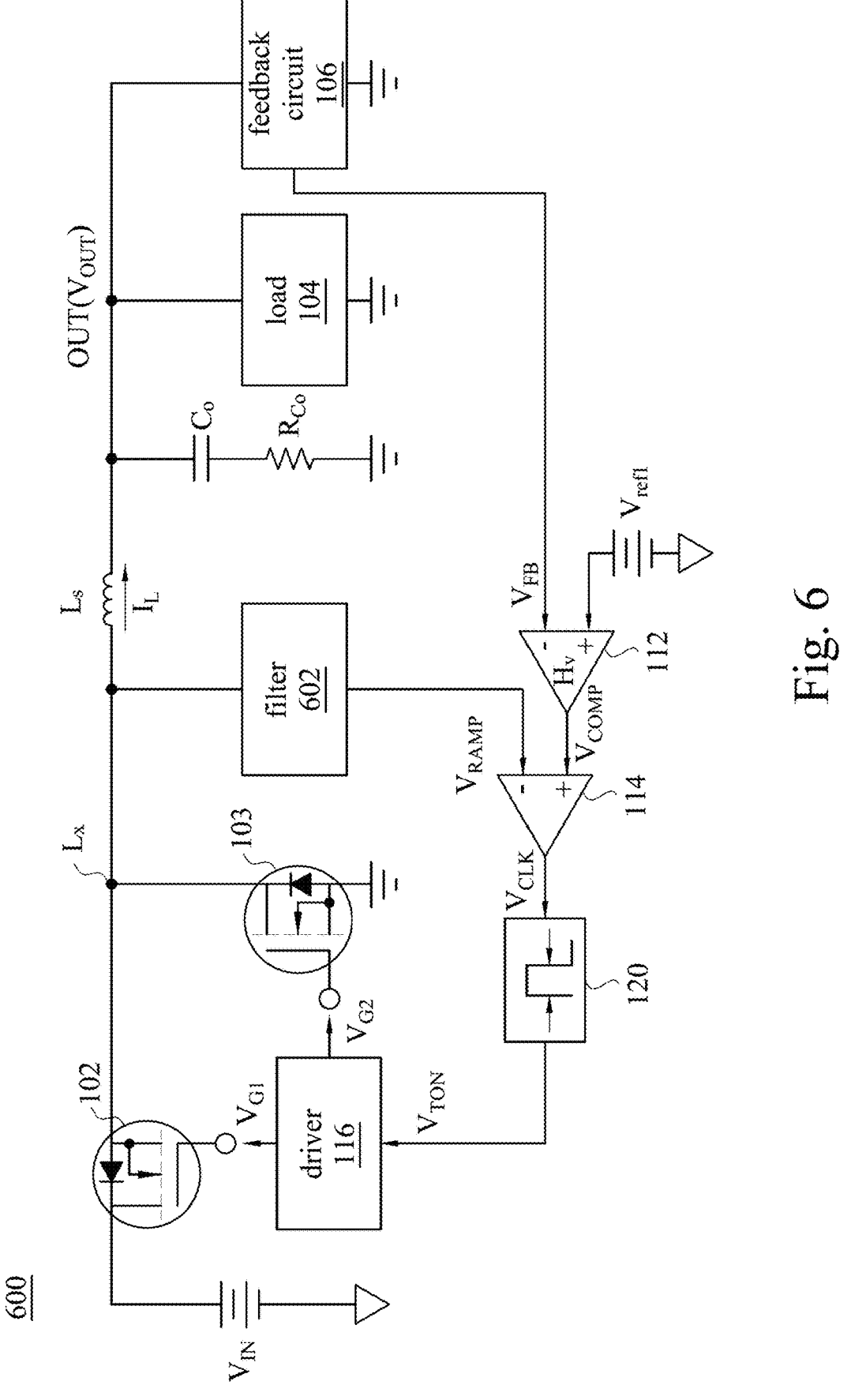
FIG. 6 depicts a schematic diagram of a buck converter according to another embodiment of the present disclosure.

A description is provided with reference to FIG. 6, FIG. 6 depicts a schematic diagram of a buck converter 600 according to another embodiment of the present disclosure. As shown in FIG. 6, the buck converter 600 comprises a high-side switch 102, a low-side switch 103, a feedback circuit 106, an error amplifier 112, a first comparator 114, a driver 116, an on-time control circuit 120, an output capacitor $C_o$, a resistor $R_{C_o}$ and a filter 602. In some embodiments, the filter 602 is electrically connected to the phase node $L_X$ to receive a square wave signal (which is associated with the current signal at the phase node $L_X$) from the switching circuit 101 and performs RC filtering to the square wave signal to generate a sawtooth wave signal or triangle wave signal as the ramp voltage signal $V_{RAMP}$, which is generally known to the person skilled in the art, and the detailed description is omitted here for brevity. The structure and the operations between high-side switch 102, the low-side switch 103, the feedback circuit 106, the error amplifier 112, the first comparator 114, the driver 116, the on-time control circuit 120, the output capacitor $C_o$ and resistor $R_{C_o}$ of the buck converter 600 correspond to the structure and the operations between the high-side switch 102, the low-side switch 103, the feedback circuit 106, the error amplifier 112, the first comparator 114, the driver 116, the on-time control circuit 120, the capacitor $C_o$ and the resistor $R_{C_o}$ of the buck converter 100 shown in FIG. 1, and the description is omitted here.

FIG. 7 depicts a flow chart of a control method 700 for a buck converter according to one embodiment of the present disclosure. To be noted that, if the outcomes that are considered as substantially equivalent can be obtained, these steps are not necessary to follow the execution sequence as shown in FIG. 7. The control method 700 in FIG. 7 can be adopted by the buck converter 100 as shown in FIG. 1, and can be summarized as the following steps.

In step 702, generating an output voltage according to an input voltage.

In step 704, generating a compensation voltage signal according to a feedback voltage signal and a first reference voltage signal, wherein the feedback voltage signal is associated with the output voltage.

In step 706, generating a clock set signal according to the compensation voltage signal and a ramp voltage signal.

In step 708, generating a first reset signal according to an on-time control signal.

In step 710, generating a second reset signal according to the clock set signal and the first reset signal.

In step 712, generating the on-time control signal according to the clock set signal and the second reset signal.

In step 714, operating a switching circuit of the buck converter according to the on-time control signal, wherein when the clock set signal has a high logic level, the second reset signal is maintained at a low logic level, as such the on-time control signal is not reset according to the second reset signal.

Since the person skilled in the art can know each step in FIG. 7 in detailed after reading the above paragraphs, the detailed description is omitted here for brevity.

Summary, the present disclosure provides the buck converter 100 utilizing the clock set signal $V_{CLK}$ cooperating with the logic gate 126 to expand the turn-on time duration, which can provide the better transient response without adding additional comparators, thus the circuit complexity does not increase significantly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A buck converter, comprising:
    a switching circuit, electrically connected to an input voltage, wherein the switching circuit is configured to generate an output voltage at an output node of the buck converter according to the input voltage;
    an error amplifier, configured to receive a feedback voltage signal and generate a compensation voltage signal according to the feedback voltage signal and a first reference voltage signal, wherein the feedback voltage signal is associated with the output voltage;
    a first comparator, electrically connected to the error amplifier, wherein the first comparator is configured to generate a clock set signal according to the compensation voltage signal and a ramp voltage signal;
    an on-time control circuit, electrically connected to the first comparator, wherein the on-time control circuit comprising:
        a reset circuit, configured to generate a first reset signal according to an on-time control signal;
        a logic gate, electrically connected to the first comparator and the reset circuit, wherein the logic gate is configured to generate a second reset signal according to the clock set signal and the first reset signal; and
        a flip-flop, electrically connected to the logic gate and the first comparator, wherein the flip-flop is configured to generate the on-time control signal according to the clock set signal and the second reset signal; and a driver, electrically connected to the on-time control circuit and the switching circuit, wherein the driver is configured to control the switching circuit according to the on-time control signal, and wherein when the clock set signal has a first logic level, the logic gate maintains the second reset signal at a second logic level different from the first logic level, as such the on-time control signal is not reset according to the second reset signal.

2. The buck converter of claim 1, wherein the first logic level is a high logic level, and the second logic level is a low logic level.

3. The buck converter of claim 1, further comprising:

an inductor, electrically connected between the switching circuit and the output node; and a feedback circuit, electrically connected to the output node, wherein the feedback circuit is configured to generate the feedback voltage signal according to the output voltage at the output node, wherein the switching circuit comprises a high-side switch and a low-side switch, and the inductor is electrically connected to the high-side switch and the low-side switch through a phase node.

4. The buck converter of claim 3, further comprising:

a sampling unit, electrically connected to the first comparator, wherein the sampling unit is configured to obtain an inductor current flowing through the inductor to generate a voltage drop as the ramp voltage signal according to the inductor current.

5. The buck converter of claim 3, further comprising:

a shunt resistor, electrically connected between the inductor and the feedback circuit; and a detection circuit, electrically connected to two terminals of the shunt resistor, wherein the detection circuit is configured to obtain a voltage difference between the two terminals of the shunt resistor, and is configured to generate the ramp voltage signal according to the obtained voltage difference.

6. The buck converter of claim 3, further comprising:

a filter, electrically connected to the phase node, wherein the filter is configured to perform filtering on a current signal associated with the phase node to generate the ramp voltage signal.

7. The buck converter of claim 3, wherein the flip-flop comprises a data input pin, a clock input pin, a reset pin and an output pin, and wherein:

the data input pin is configured to receive an enable signal, the clock input pin is electrically connected to an output terminal of the first comparator, and wherein the clock input pin is configured to receive the clock set signal, the reset pin is electrically connected to the logic gate, wherein the reset pin is configured to receive the second reset signal, and the output pin is configured to output the on-time control signal.

8. The buck converter of claim 7, wherein the enable signal has the first logic level, and wherein:

when the second reset signal has the second logic level and the clock set signal has the first logic level, the flip-flop generates the on-time control signal having the first logic level, and when the second reset signal has the first logic level, the flip-flop generates the on-time control signal having the second logic level.

9. The buck converter of claim 1, wherein the reset circuit comprises:

a second comparator, comprising a first input terminal configured to receive a second reference voltage signal and a second input terminal electrically connected to a current source;

a capacitor comprising a first terminal electrically connected to the current source and a second terminal electrically connected to a ground terminal; and a switch, electrically connected to the current source and the ground terminal, and wherein the switch operates according to the on-time control signal.

10. The buck converter of claim 9, wherein the reset circuit further comprises an inverter electrically connected to a control terminal of the switch, and an input terminal of the inverter is configured to receive the on-time control signal, and wherein:

when the on-time control signal has the first logic level, the switch is turned off, such that the capacitor is charged by the current source, and the first reset signal output by the second comparator has the first logic level when the capacitor is charged to a voltage level that is greater than the second reference voltage signal, and when the on-time control signal has the second logic level, the switch is turned on, such that the capacitor is discharged through the ground terminal, and the second comparator outputs the first reset signal having the second logic level when the capacitor is discharged to a voltage level that is less than the second reference voltage signal.

11. The buck converter of claim 9, wherein during a period when the compensation voltage signal is greater than the ramp voltage signal, even if a voltage at the first terminal of the capacitor is gradually increased to be greater than the second reference voltage signal, the logic gate maintains the second reset signal at the second logic level.

12. A control method for a buck converter, the buck converter comprises a switching circuit, an error amplifier, a first comparator, an on-time control circuit and a driver, wherein the first comparator is electrically connected to the error amplifier, the on-time control circuit is electrically connected to the first comparator, the driver is electrically connected to the on-time control circuit and the switching circuit, the on-time control circuit comprises a reset circuit, a logic gate and a flip-flop, the logic gate is electrically connected to the first comparator and the reset circuit, and the flip-flop is electrically connected to the logic gate and the first comparator, and wherein the control method comprises:

generating, by the switching circuit, an output voltage at an output terminal of the buck converter according to an input voltage;

generating, by the error amplifier, a compensation voltage signal according to a feedback voltage signal and a first reference voltage signal, wherein the feedback voltage signal is associated with the output voltage;

generating, by the first comparator, a clock set signal according to the compensation voltage signal and a ramp voltage signal;

generating, by the reset circuit, a first reset signal according to an on-time control signal;

generating, by the logic gate, a second reset signal according to the clock set signal and the first reset signal;

generating, by the flip-flop, the on-time control signal according to the clock set signal and the second reset signal; and controlling, by the driver, the switching circuit according to the on-time control signal, when the clock set signal has a first logic level, the second reset signal is maintained, by the logic gate, at a second logic level different from the first logic level, as such the on-time control signal is not reset according to the second reset signal.

13. The control method of claim 12, wherein the first logic level is a high logic level, and the second logic level is a low logic level.

14. The control method of claim 12, wherein the buck converter further comprises an inductor and a sampling unit, wherein inductor is electrically connected between the switching circuit and an output node of the buck converter, the sampling unit is electrically connected to the first comparator, and wherein the control method further comprises:

obtaining, by the sampling unit, an inductor current flowing through the inductor; and generating, by the sampling unit, a voltage drop as the ramp voltage signal according to the inductor current.

15. The control method of claim 12, wherein the buck converter further comprises an inductor, a shunt resistor and a detection circuit, wherein inductor is electrically connected between the switching circuit and an output node of the buck converter, the shunt resistor is electrically connected between the inductor and the output node of the buck converter, the detection circuit is electrically connected to two terminals of the shunt resistor, and wherein the control method further comprises:

obtaining, by the detection circuit, a voltage difference between the two terminals of the shunt resistor; and generating, by the detection circuit, the ramp voltage signal according to the obtained voltage difference.

16. The control method of claim 12, wherein the buck converter further comprises an inductor and a filter, wherein the switching circuit comprises a high-side switch and a low-side switch, wherein the inductor is electrically connected between the switching circuit and an output node of the buck converter, and the inductor is electrically connected to the high-side switch and the low-side switch through a phase node, wherein the filter is electrically connected to the phase node, wherein the control method further comprises:

performing filtering, by the filter, on a current signal associated with the phase node to generate the ramp voltage signal.

17. The control method of claim 12, further comprises:

when the second reset signal has the second logic level and the clock set signal has the first logic level, generating, by the flip-flop, the on-time control signal having the first logic level, and when the second reset signal has the first logic level, generating, by the flip-flop, the on-time control signal having the second logic level.

18. The control method of claim 12, wherein the reset circuit comprises a second comparator, a capacitor and a switch, a first input terminal of the second comparator configured to receive a second reference voltage signal, and the capacitor and the switch connected in parallel between a second input terminal of the second comparator and a ground terminal, and wherein the control method further comprises:

comparing, by the second comparator, a voltage at second input terminal of the second comparator with the second reference voltage signal to generate the first reset signal.

19. The control method of claim 18, wherein the reset circuit further comprises an inverter electrically connected to a control terminal of the switch, and an input terminal of the inverter is configured to receive the on-time control signal, and wherein the control method further comprises:

during a period when the switch is turned off due to the on-time control signal having the first logic level, outputting, by the second comparator, the first reset signal having the first logic level when the capacitor is charged to a voltage level that is greater than the second reference voltage signal; and during a period when the switch is turned on due to the on-time control signal having the second logic level, outputting, by the second comparator, the first reset signal having the second logic level when the capacitor is discharged to a voltage level that is less than the second reference voltage signal.

20. The control method of claim 18, wherein during a period when the compensation voltage signal is greater than the ramp voltage signal, maintaining, by the logic gate, the second reset signal at the second logic level, even if a voltage at the second input terminal of the second comparator is gradually increased to be greater than the second reference voltage signal.

* * * * *